M. M. Turner.
Chart for Cutting Dresses.
No. 46409. Patented Feb. 14, 1865.
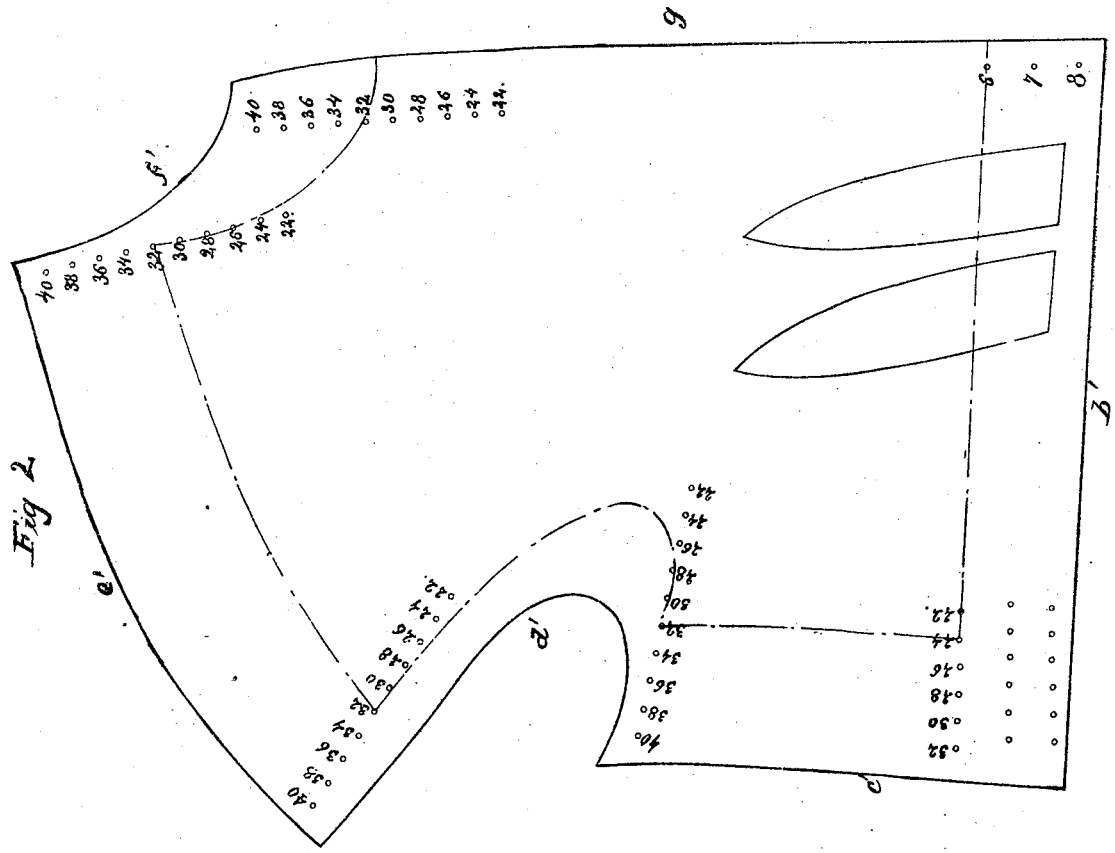
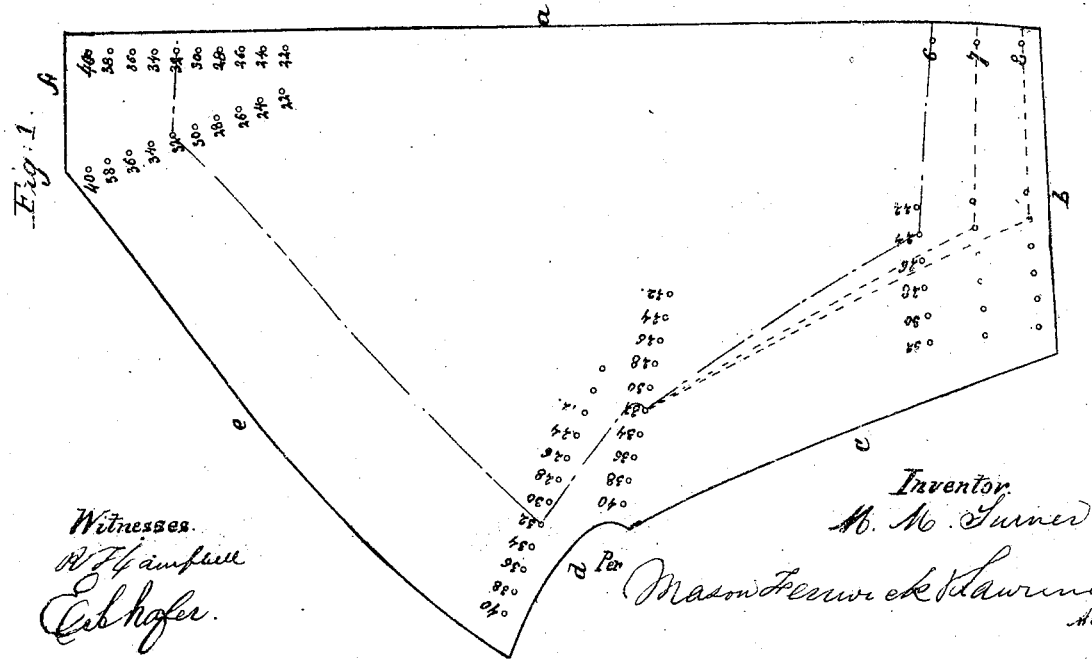
Witnesses.
Inventor.
M. M. Turner.
Per Mason Fenwick & Lawrence
Atty's

UNITED STATES PATENT OFFICE.

M. M. TURNER, OF NORTH FAIRFIELD, OHIO.

IMPROVEMENT IN METHODS OF FINDING WAIST AND CHEST MEASUREMENTS OF LADIES' DRESSES.

Specification forming part of Letters Patent No. 46,409, dated February 14, 1865.

*To all whom it may concern:*

Be it known that I, M. M. TURNER, of North Fairfield, Huron county, State of Ohio, have invented a new and Improved Chart for Cutting Dresses; and I do hereby declare that the following is a full, clear, and exact description thereof, reference being had to the accompanying drawings, making a part of this specification, in which—

Figure 1 is the chart for the back of a lady's dress-body. Fig. 2 is the chart for the front of a lady's dress-body.

Similar letters of reference indicate corresponding parts in both figures.

The object of this invention is to enable any person of ordinary intelligence to accurately cut and fit ladies' dress bodies of different sizes and proportions by means of a systematically constructed chart, which has indicated upon it all the various sizes and forms corresponding to the different measurements which it is necessary to make.

My improvement relates particularly to a mode of determining the width and length of waist, in conjunction with a chart which will indicate other necessary measures and configurations, as will be hereinafter described.

To enable others skilled in the art to make and use my invention, I will describe its construction and operation.

Before describing my charts I will state that they may be made of pasteboard, thin paper, or of any material which will best answer the purpose. The stiff board will be found to answer the best purpose, as its edges will answer as rules or guides by which to deliniate the desired pattern.

In Fig. 1 I have represented a chart for producing the back, $a$ being the back, $b$ the waist, $c$ the length of waist, $d$ the arm-hole, $e$ the shoulder, and $f$ the neck. In Fig. 2, $g$ represents the front edge of the chart, $b'$ the waist, $c'$ the length of waist from armhole, $d'$ the armhole, $e'$ the shoulder, and $f'$ the neck. In order to find the desired length or size of any one or all of these points and to transfer a pattern of a desired size upon paper or upon the work to be cut out, I have arranged a number of rows of dots or holes corresponding to every point to be determined before a pattern can be drawn. These dots or holes are arranged in rows corresponding to each angle on the chart, and as the dots or holes are exactly one inch apart (the drawing is reduced one-half) these correspond to the "tape-measurement."

The four rows of figures, running from 22 to 40, respectively, are used to indicate the chest-measurements; the rows of figures running from 22 to 32 indicate the different sizes or circumferences of waist; and the rows of figures along the edges $a$ $g$ and numbering 8 7 6, are used to indicate the different lengths of the waist. Suppose a lady measures thirty-two inches around the chest close up under the arms, we then dot through the holes corresponding to number 32 on the chart, wherever this number occurs. Suppose, also, that the same lady measures twenty-four inches around the waist, we dot at 24 and 6. If she measures twenty-four inches around the waist and has a waist seven inches long, we dot in the row 24, but in a line with figure 7. If the waist is eight inches long and twenty-four around, we dot in the line indicated by figure 8, but directly below the figure 24. The pattern thus produced is indicated in Figs. 1 and 2 in red lines. The method of using the front is precisely the same as described for the back.

Directions: One measurement around the chest close under the arms, another around the bottom of the waist, and the length of the waist under the arm. Dot beside the figures that indicate the chest-measurement and opposite the figures that indicate the width and length of the waist. Use the corresponding edge of the model for a rule, and rule from dot to dot. Take the same figures on the back.

From this description it will be seen that I am enabled to accurately determine by my chart the width and length of the waist, and to draft the same upon the work to be cut.

I am aware that modes of obtaining the chest-measurements upon the principles described by me are not new, and therefore I do not claim such as my invention.

What I claim as my invention, and desire to secure by Letters Patent, is—

The method of finding the waist and chest measurements, substantially as described.

M. M. TURNER.

Witnesses:
A. D. COOK,
S. L. COOK.